United States Patent [19]

Yoshioka et al.

[11] Patent Number: 4,702,218

[45] Date of Patent: Oct. 27, 1987

[54] ENGINE INTAKE SYSTEM HAVING A PRESSURE WAVE SUPERCHARGER

[75] Inventors: Sadashichi Yoshioka; Tsutomu Matsuoka; Shigeki Hamada, all of Hiroshima; Humio Hinatase, Aki, all of Japan

[73] Assignee: Mazda Motor Corporation, Hiroshima, Japan

[21] Appl. No.: 757,946

[22] Filed: Jul. 23, 1985

[30] Foreign Application Priority Data

Jul. 24, 1984 [JP] Japan ................... 59-154599
Jul. 24, 1984 [JP] Japan ................... 59-154600
Jul. 24, 1984 [JP] Japan ................... 59-112924

[51] Int. Cl.$^4$ .............................. F02B 33/42
[52] U.S. Cl. ........................ 623/559; 60/605
[58] Field of Search ............. 60/605, 611; 123/554, 123/564

[56] References Cited

U.S. PATENT DOCUMENTS

| | | | |
|---|---|---|---|
| 2,853,987 | 9/1958 | Berchtold et al. | 123/559 |
| 3,874,166 | 4/1975 | Kirchhofer et al. | 123/559 X |
| 4,170,107 | 10/1979 | Horler | 123/559 |
| 4,222,240 | 9/1980 | Castellano | 60/611 |
| 4,474,008 | 10/1984 | Sakurai et al. | 60/605 |
| 4,485,625 | 12/1984 | Fujimoto et al. | 60/605 X |
| 4,561,407 | 12/1985 | Jaussi et al. | 123/559 |

FOREIGN PATENT DOCUMENTS

| | | | |
|---|---|---|---|
| 1917259 | 10/1969 | Fed. Rep. of Germany | 60/605 |
| 1153 | 2/1963 | Japan . | |
| 84841 | 6/1980 | Japan | 60/605 |
| 57-063 | 4/1983 | Japan | 60/605 |
| 58-108256 | 7/1983 | Japan . | |

*Primary Examiner*—Michael Koczo
*Attorney, Agent, or Firm*—Fleit, Jacobson, Cohn & Price

[57] ABSTRACT

An engine intake system including a supercharger of a type wherein the intake air drawn from the intake air inlet port is compressed by the pressure of the exhaust gas before it is discharged through the intake air outlet port. An exhaust gas recirculation passage is provided between the exhaust passage upstream of the supercharger and the intake passage downstream of the supercharger. The recirculation passage can be used for decreasing the pressure difference between the exhaust gas and the intake air to thereby minimize the engine pumping loss. Further, the recirculation passage can be used for recirculating the exhaust gas to the intake passage to thereby decrease nitrogen oxides in the exhaust gas.

9 Claims, 4 Drawing Figures

ENGINE INTAKE SYSTEM HAVING A PRESSURE WAVE SUPERCHARGER

BACKGROUND OF THE INVENTION

1. Field of the Invention

The present invention relates to a supercharged engine, and more particularly to an engine having a supercharger of a type in which the intake air is compressed by the pressure of the exhaust gas before it is introduced into the combustion chamber.

2. Description of Prior Art

Hithertofore, proposals have already been made of an engine supercharger which utilizes the pressure of the exhaust gas produced in the engine exhaust passage for compressing the intake air before the intake air is introduced into the combustion chamber. This type of supercharger is considered as being advantageous over turbo-superchargers because it can provide a higher supercharging effect under a low speed engine operation. A supercharger of this type generally includes a rotor having a plurality of mutually separated, axially extending gas passages and a casing supporting the rotor for rotation about an axis of rotation. The casing is provided with exhaust gas inlet and outlet openings and intake gas inlet and outlet openings which are located at opposite axial ends of the rotor. The arrangements are such that the intake air is drawn into the gas passages through the intake gas inlet opening and compressed by the pressure of the exhaust gas introduced into the gas passages through the exhaust gas inlet opening. As the rotor rotates, the gas passages are sequentially opened to the intake gas outlet opening so that the intake gas is forced by the exhaust gas to flow into the intake passage communicating with the intake gas outlet opening. Thereafter, the passages are opened to the exhaust gas outlet opening so that the exhaust gas is allowed to flow into the exhaust passage communicating with the exhaust gas outlet opening. The passages in the rotor are then scavenged by the air drawn from the intake gas inlet opening and passed through the passages to the exhaust gas outlet openings. Thus, it is required that the exhaust gas inlet opening and the intake gas outlet opening be located axially opposite to each other with respect to the rotor. An example of such a supercharger is disclosed by Japanese patent publication No. 38-1153. The supercharger disclosed by the Japanese patent publication is of a type wherein the exhaust gas inlet and outlet openings are located at one axial end of the rotor and the intake gas inlet and outlet openings are located at the other axial end so that the exhaust gas and the intake gas change their flow directions in the gas passages. As disclosed in detail by the Japanese magazine "Nainen-Kikan (Internal Combustion Engines)" Vol. 15, No. 179, 1976 June issue, there is also known a so-called through-flow type wherein the gas inlet and outlet openings are arranged so that the exhaust gas and the intake gas flow axially through the gas passages without changing the flow directions.

The supercharger of the aforementioned type is considered as being particularly suitable for diesel cycle engines, but can of course be used in gasoline engines as well.

In an engine having the aforementioned type of supercharger, the rotor of the supercharger is located in the engine exhaust passage, providing a resistance to the exhaust gas flow. Further, the exhaust gas in the passages of the supercharger rotor is opposed by the pressure of the intake air at the intake air outlet opening. As a result, the pressure of the exhaust gas in the exhaust passage upstream of the supercharger is maintained at a high level, providing a substantial back pressure to the engine exhaust port. Thus, the exhaust gas pressure at the engine exhaust port is markedly higher than the intake pressure at the engine intake port, resulting in an increased pumping loss.

It may be possible to decrease the pumping loss by relieving a part of the intake air in the intake passage downstream of the supercharger to the intake passage upstream of the supercharger to thereby decrease the intake air pressure opposing the exhaust gas in the passages of the supercharger rotor. However, such an intake air pressure relief is not recommendable under heavy load engine operation because a decrease in the supercharging pressure will cause a decrease in the intake air charge resulting in insufficient engine output and poor fuel economy. Further, this will also cause smoke in the exhaust gas in case of a diesel engine.

The intake air pressure relief further causes problems even under engine operation other than the heavy load condition. In the aforementioned type of supercharger, it is possible that the exhaust gas drawn from the exhaust gas inlet opening to the passages of the supercharger rotor is passed to the intake air outlet opening to be mixed with the intake air. This phenomenon may be utilized as a measure for providing exhaust gas recirculation, which is generally adopted for suppressing nitrogen oxides in the exhaust gas. However, when the intake air in the intake passage downstream of the supercharger is partly relieved to the intake passage upstream of the supercharger, the exhaust gas which has previously been mixed with the intake gas is also passed to the intake passage upstream of the supercharger. Such processes are recycled and the exhaust gas content in the intake air is ultimately increased to an extent that smooth engine operation is disturbed. Further, an increase in the exhaust gas content in the intake air causes an increase in the supercharger rotor temperature because the intake air can no longer cool the rotor to a satisfactory level.

It should further be noted that the exhaust gas recirculation effect accomplished by the exhaust gas which has passed through the passages in the supercharger rotor to the intake air outlet opening is, in general, insufficient in amount. It may be possible to increase the amount of recirculated exhaust gas by appropriately controlling the rotating speed of the rotor. However, an increase in the recirculated exhaust gas causes an undesirable increase in the temperature of the rotor. Further, where the supercharger is provided with a waste gate valve for relieving the exhaust gas pressure upstream of the supercharger to the exhaust passage downstream of the supercharger, for preventing the exhaust gas pressure from being increased to a dangerous level, the operation of the waste gate valve may cause a decrease in the exhaust gas pressure to a level wherein the amount of the recirculated gas is undesirably decreased.

SUMMARY OF THE INVENTION

It is therefore an object of the present invention to provide an engine having a supercharger of the aforementioned type, wherein one or more of the above problems are eliminated.

Another object of the present invention is to provide an engine having a supercharger of the aforementioned type wherein means is provided for relieving the exhaust gas in the exhaust passage upstream of the supercharger to the intake passage downstream of the supercharger.

A further object of the present invention is to provide an engine having a supercharger of the aforementioned type wherein the pumping loss of the engine can be effectively decreased.

A still further object of the present invention is to provide an engine having a supercharger of the aforementioned type wherein exhaust gas recirculation can appropriately be controlled.

According to the present invention, the above and other objects can be accomplished by a supercharged engine having supercharging means comprising casing means, rotor means rotatably carried in said casing and having a plurality of axially extending passages, intake air inlet opening means and exhaust gas outlet opening means formed in said casing means at portions opposing the opposite axial ends of the rotor means, intake air outlet opening means and exhaust gas inlet opening means formed in said casing means at portions opposing the opposite axial ends of the rotor means, engine exhaust passage means connected with said exhaust gas inlet opening means, exhaust gas outlet passage means connected with said exhaust gas outlet opening means, engine intake passage means connected with said intake air outlet opening means, driving means for rotationally driving said rotor means so that intake air drawn into the axially extending passages in the rotor means through said intake air inlet opening means is compressed by engine exhaust gas drawn into said axially extending passages in the rotor means through said exhaust gas inlet opening means and is discharged into said intake passage means through said intake air outlet opening means, the improvement comprising recirculation passage means extending between said engine exhaust passage means and said engine intake passage means, control valve means provided in said recirculation passage means, control means for controlling operation of said control valve means in accordance with an engine operating condition. The control valve means may be opened at least under light load engine operation so that the engine exhaust gas pressure is relieved to the engine intake passage. This operation will be effective to decrease the differential pressure between the exhaust gas and the intake air and therefore decrease the pumping loss.

There may be provided exhaust bypass passage means extending between the engine exhaust passage means and the exhaust gas outlet passage means. The exhaust bypass passage means may be provided with bypass valve means which is controlled so that its opening is increased as the demand for exhaust gas recirculation decreases. There may also be provided intake bypass passage means for connecting the intake passage means with said intake air inlet opening means. The intake bypass passage means may be provided with second bypass valve means and opened to the engine intake passage means upstream of the opening of the recirculation passage means.

The above and other objects and features of the present invention will become apparent from the following description of the preferred embodiments, taking reference to the accompanying drawings.

DESCRIPTION OF THE PREFERRED EMBODIMENTS

Figure 1:
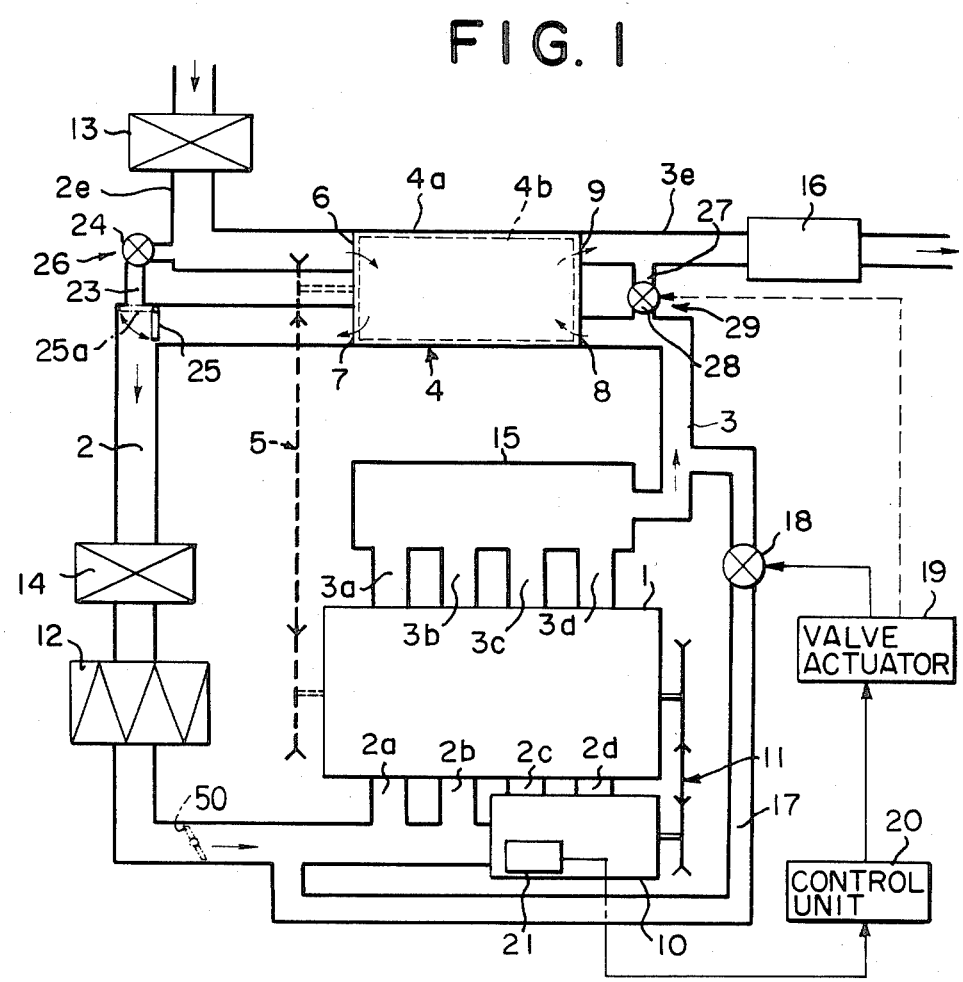
FIG. 1 is a diagrammatical illustration of an engine in accordance with one embodiment of the present invention.

Referring to the drawings, particularly to FIG. 1, there is shown a four-cylinder diesel engine 1 having an intake passage 2 connected through branch passages 2a, 2b, 2c and 2d with respective cylinders of the engine 1. There is further provided an exhaust passage 3 which has a surge tank 15 connected through branch passages 3a, 3b, 3c and 3d with the respective cylinders of the engine 1.

The engine 1 is provided with a supercharger 4 of a type as disclosed by the aforementioned Japanese patent publication No. 38-1153. The supercharger 4 has a casing 4a formed at one axial end with an intake air inlet opening 6 and an intake air outlet opening 7, and at the other axial end with an exhaust gas inlet opening 8 and an exhaust gas outlet opening 9. In the casing 4a, there is a rotor 4b which is rotationally driven through a belt 5 by the engine crankshaft. The intake air inlet opening 6 is connected with an intake air inlet passage 2e having an air cleaner 13. The intake air outlet opening 7 is connected with the intake passage 2, which is provided with an air cleaner 14 finer than the air cleaner 13. Downstream of the air cleaner 14, there is an intercooler 12. The exhaust gas inlet opening 8 is connected with the exhaust passage 3, whereas the exhaust gas outlet passage 9 is connected with an exhaust gas outlet passage 3e which has a silencer 16. The operation of the supercharger 4 of this type is fully described in the aforementioned Japanese patent publication so that the descriptions will be omitted.

As conventional in diesel engines, the engine 1 is also provided with a fuel pump 10 which is driven by the engine crankshaft through a belt 11 to distribute fuel to the respective cylinders. An engine load detector 21 is provided on the fuel pump 10 to produce an engine load signal which is applied to a control unit 20.

A communicating passage 17 extends between the exhaust passage 3 and the intake passage 2 downstream of the intercooler 12. In the communicating passage 17, there is provided a shut-off valve 18 which is controlled by a valve actuator 19. The valve actuator 19 is controlled by the output of the control unit 20 to open the valve 18 under a light load operation of the engine 1. Between the inlet passage 2e and the intake passage 2, there is an intake bypass passage 23 provided with a check valve 24 which allows intake air flow from the passage 2e to the passage 2 but blocks the flow in the opposite direction. In the intake passage 2, there is provided a switching valve 25 which alternately opens the intake air outlet opening 7 and the passage 23 to the intake passage 2. The valves 24 and 25 together constitute a starting valve device 26. Between the exhaust passage 3 and the outlet passage 3e, there is an exhaust bypass passage 27 having a waste gate valve 28 which is adapted to be operated by the valve actuator 19. The passage 27 and the valve 28 constitute a waste gate device 29.

During engine starting, the valve 25 is positioned as shown in solid lines in FIG. 1 so that the intake air is passed from the inlet passage 2e through the intake bypass passage 23 to the intake passage 2. Thus, it is possible to decrease the load on the engine during the starting period.

After the engine has started, the valve 25 is moved to the position shown by phantom lines 25a and the rotor 4b of the supercharger 4 is rotationally driven by the engine crankshaft. The intake air is then passed through the supercharger 4 to the intake passage 2. In the supercharger 4, the intake air is compressed by the pressure of the exhaust gas. Under light load engine operation, the valve actuator 19 opens the shut-off valve 18 so that the exhaust gas pressure in the exhaust passage 3 is relieved to the intake passage 2. The exhaust gas pressure in the passage 3 is therefore decreased and becomes close to the intake air pressure in the intake passage 2. Thus, it is possible to decrease the engine pumping loss. As an example, it has been confirmed that, under an engine speed of 2000 rpm, the difference between the exhaust gas pressure and the intake air pressure can be decreased by approximately 30%, and as a result the fuel consumption can be improved by approximately 2.2%. In the illustrated embodiment, the valve actuator 19 further opens the waste gate valve 28 under light load engine operation. Thus, the exhaust gas pressure can further be decreased.

It should be noted that, in the illustrated embodiment, the passage 17 is opened to the intake passage downstream of the intercooler 12. The exhaust gas directed to the intake passage 2 provides an exhaust gas recirculation effect without giving adverse effects on the air cleaner 14 and the intercooler 12. Thus, it is possible to decrease the nitrogen oxides in the exhaust gas under light load engine operation. It should of course be noted that the valves 18 and 28 may not be of the ON-OFF type, but may be of a type wherein the degree of opening can be increased continuously in response to a decrease in engine load.

Figure 2:
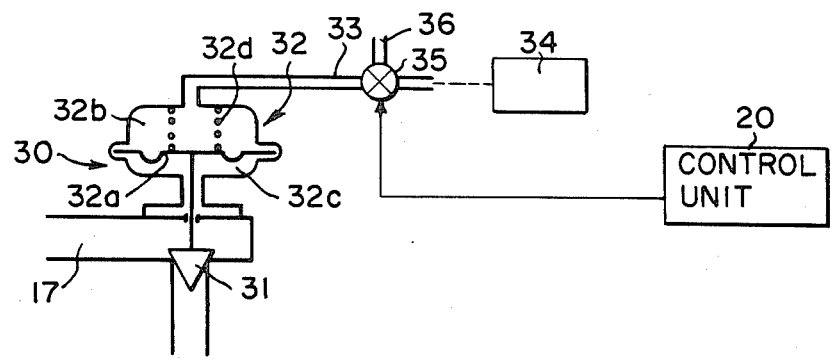
FIG. 2 is a diagrammatical sectional view showing the exhaust gas recirculation valve.

In an alternative embodiment, the shut-off valve 18 is substituted by an exhaust gas recirculation control valve 30 as shown in FIG. 2. The recirculation control valve 30 includes a valve member 31 disposed in the passage 17, which now constitutes an exhaust gas recirculation passage. The valve member 31 is connected with a valve actuator 32 having a diaphragm 32a connected to the valve member 31. At one side of the diaphragm 32a, there is defined a suction pressure chamber 32b, and at the other side, there is an atmospheric pressure chamber 32c. In the suction pressure chamber 32b, there is spring 32d which acts on the diaphragm 32a to force the valve member 31 toward a closed position. The suction pressure chamber 32b is connected through a vacuum line 33 with a vacuum source 34. In the vacuum line 33, there is a control valve 35 having a discharge port 36. The control valve 35 is operated under the output of the control unit 20 so that the suction pressure in the chamber 32b, and therefore the position of the valve member 31, are determined in accordance with the engine operating condition.

Figure 3:
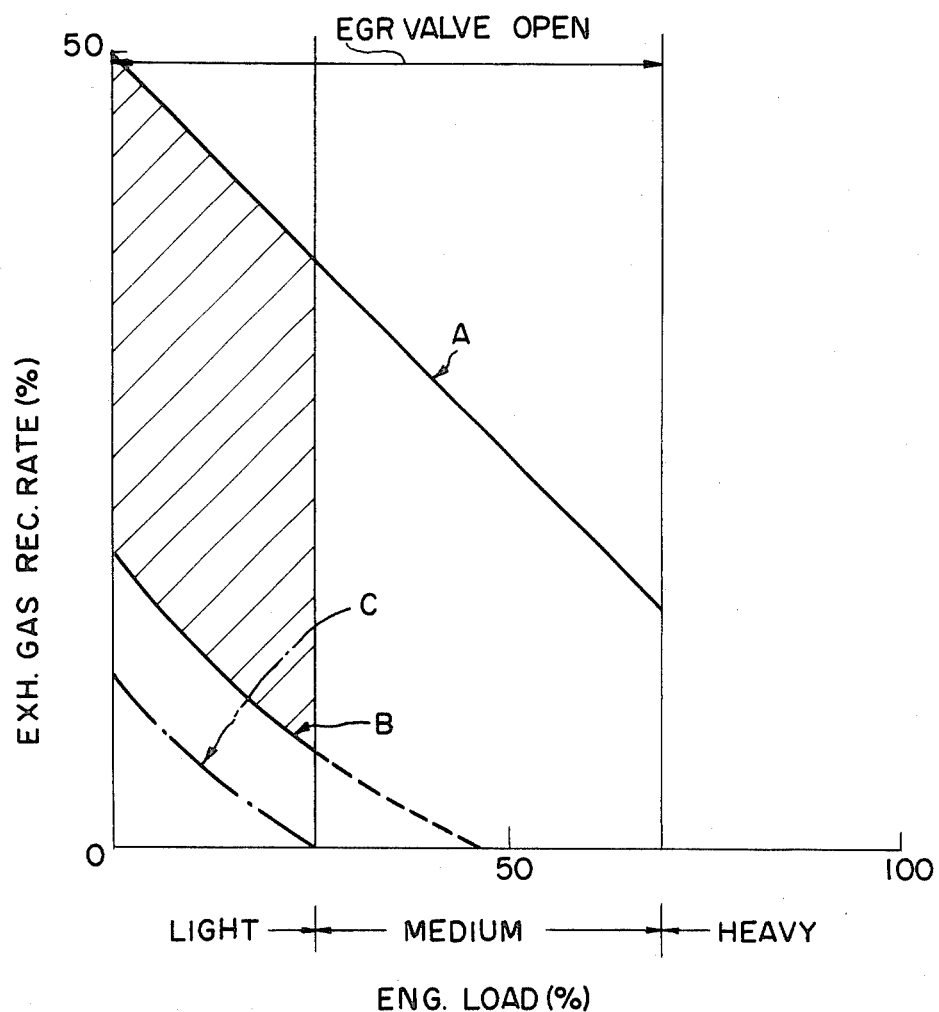
FIG. 3 is a diagram showing a change in the exhaust gas recirculation rate in accordance with the engine load.

FIG. 3 shows a chart for controlling the exhaust gas recirculation rate. As shown by a line A, it is desirable to decrease the recirculation rate in response to an increase in the engine load in the light and medium load engine operating ranges. In the supercharger of the type as used herein, a certain amount of exhaust gas is passed through the passages in the rotor 4b to the intake air outlet opening 7. The curve B in FIG. 3 shows the recirculation rate as obtained by such internally recirculated exhaust gas when the waste gate valve 28 is closed. Where the waste gate valve 38 is opened, the recirculation rate under the internal recirculation changes as shown by a curve C.

Figure 4:
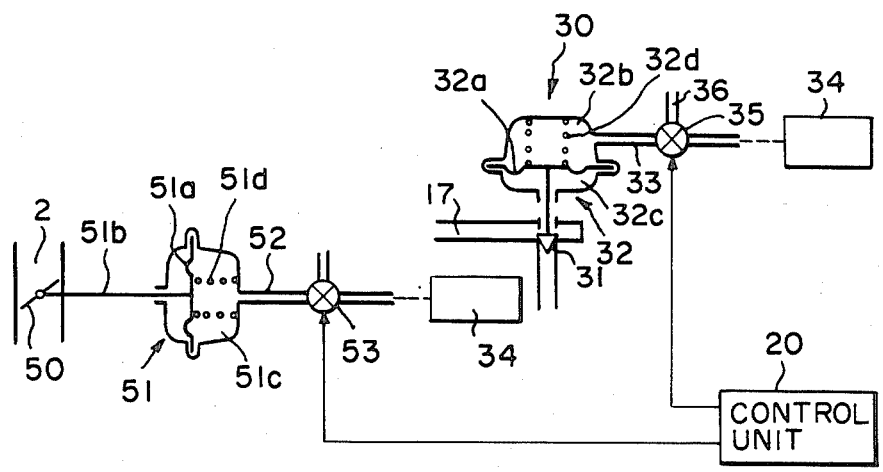
FIG. 4 is a diagrammatical sectional view showing the throttle valve control device.

Under light load operation, the waste gate valve 28 is closed and the recirculation control valve 30 is operated. Thus, the internal recirculation is obtained as shown by the curve B and further an external exhaust gas recirculation is established through the passage 17 as shown by the cross-hatched area in FIG. 3. Under medium load operation, the waste gate valve 28 is opened so that there is substantially no internal recirculation. By operating the recirculation control valve 30, exhaust gas recirculation is accomplished through the passage 17. The recirculation rate through the passage 17 is substantially determined by the pressure drop across the valve 30. It will be noted in FIG. 3 that the change in the external recirculation rate is very small as compared with the change in the overall recirculation rate. It is therefore possible to reduce the amount of movement of the valve member 31 to accomplish the desired recirculation rate.

Where the present invention is applied to a gasoline engine, a throttle valve 50 is provided in the intake passage 2 as shown in FIG. 4 and by a phantom line in FIG. 1. The throttle valve 50 is located upstream of the position where the recirculation passage is opened. In the example shown in FIG. 4, the throttle valve 50 is actuated by a pneumatic actuator 51 which includes a diaphragm 51a connected through an actuating link 51b with the throttle valve 50. At one side of the diaphragm 51a, there is defined a suction pressure chamber 51c which is connected through a vacuum line 52 with the vacuum source 34. In the chamber 51c, there is a spring 51d which acts on the diaphragm 51a to force the throttle valve 50 toward the minimum opening position. In the line 52, there is provided a control valve 53 which alternately connects the suction pressure chamber 51c with the vacuum source 34 or the atmosphere. The control valve 53 is controlled by the output from the control unit 20 so that the position of the throttle valve 51 is determined by a manually actuated member such as a fott pedal (not shown). The system is also provided with an exhaust gas recirculation control valve 30 which is basically the same as that in the previous embodiment.

The invention has thus been shown and described with reference to specific embodiments. However it should be noted that the invention is in no way limited to the details of the illustrated arrangements, and changes and modifications may be made without departing from the scope of the appended claims.

What is claimed:

1. A supercharged diesel cycle engine comprising: an engine, supercharging means including casing means, rotor means rotatably carried in said casing means and having a plurality of axially extending passages, intake air inlet opening means and exhaust gas outlet opening means formed in said casing means at opposite axial ends of the rotor means, intake air outlet opening means and exhaust gas inlet opening means formed in said casing means at opposite axial ends of the rotor means, engine exhaust passage means connected with said exhaust gas inlet opening means and provided with surging chamber means, exhaust gas outlet passage means connected with said exhaust gas outlet opening means, engine supercharged air intake passage means connected with said intake air outlet opening means, engine intake air inlet passage means connected with said intake air inlet opening means, driving means for rotationally driving said rotor means so that intake air drawn into the axially extending passages in the rotor means from said engine intake air inlet passage means through said intake air inlet opening means is compressed by engine exhaust gas drawn into said axially extending passages in the rotor means from said engine exhaust passage means through said exhaust gas inlet opening means and discharged into said supercharged air intake passage means through said intake air outlet opening means, intake bypass passage means bypassing said supercharging means and connecting said intake air inlet passage means with said supercharged air intake passage means, starting valve means provided in said intake bypass passage means at a junction with said supercharged air intake passage means to open said intake bypass passage means and close said supercharged air intake passage means at least in an engine starting period to lead intake air through said intake bypass passage means, recirculation passage means extending between said engine exhaust passage means and said engine supercharged air intake passage means, said recirculation passage means being opened to said engine exhaust passage means downstream from the surging chamber means, and to said supercharged air intake passage means downstream from the junction with the intake bypass passage means, control valve means provided in said recirculation passage means, control means for controlling operation of said control valve means so that said control valve means is opened at least under light load engine operation, intercooler means provided in said supercharged air intake passage means downstream from a portion where said intake bypass passage means is connected with the supercharged air intake passage means and upstream from a portion where said recirculation passage means is opened to said supercharged air intake passage means.

2. A supercharged engine in accordance with claim 1, which includes first air filter means provided in said engine intake air inlet passage means upstream of the intake air inlet opening means and second air filter means provided in said engine intake passage means downstream of the intake air outlet opening means at a position downstream of the intake bypass means and upstream of the recirculation passage means.

3. A supercharged engine in accordance with claim 1, in which throttle valve means is provided in said engine intake passage means downstream of the intake bypass passage means and the intercooler means.

4. A supercharged engine in accordance with claim 3 in which said recirculation passage means is opened to said engine intake passage means downstream of the throttle valve means.

5. A supercharged engine in accordance with claim 1 which includes exhaust bypass passage means extending between the engine exhaust passage means and the exhaust gas outlet passage means, exhaust bypass valve means provided in said exhaust bypass passage means, means for controlling said exhaust bypass valve means so that its opening is increased as the demand for exhaust gas recirculation to the engine intake passage means decreases.

6. A supercharged engine in accordance with claim 5 in which the last mentioned means is means for decreasing the opening of the exhaust bypass valve means as engine load decreases.

7. A supercharged engine in accordance with claim 5 in which said control means is means for opening said control valve means at least under a light load engine operation.

8. A supercharged engine in accordance with claim 7 in which said means for controlling said exhaust bypass valve means is means for decreasing the opening of the exhaust bypass valve means as engine load decreases.

9. A supercharged engine comprising: an engine, supercharging means including casing means, rotor means rotatably carried in said casing means and having a plurality of axially extending passages, intake air inlet opening means and exhaust gas outlet opening means formed in said casing means at opposite axial ends of the rotor means, intake air outlet opening means and exhaust gas inlet opening means formed in said casing means at opposite axial ends of the rotor means, engine exhaust passage means connected with said exhaust gas inlet opening means, exhaust gas outlet passage means connected with said exhaust gas outlet opening means, engine supercharged air intake passage means connected with said intake air outlet opening means, engine intake air inlet passage means connected with said intake air inlet opening means, driving means for rotationally driving said rotor means so that intake air drawn into the axially extending passages in the rotor means from said engine intake air inlet passage means through said intake air inlet opening means is compressed by engine exhaust gas drawn into said axially extending passages in the rotor means from said engine exhaust passage means through said exhaust gas inlet opening means and discharged into said supercharged air intake passage means through said intake air outlet opening means, recirculation passage means extending between said engine exhaust passage means and said engine supercharged air intake passage means, said recirculation passage means positioned downstream from the supercharging means, control valve means provided in said recirculation passage means, control means for controlling operation of said control valve means so that said control valve means is opened at least under light load engine operation, intake bypass passage means for connecting the intake passage means with said intake air inlet opening means, intake bypass valve means provided in said intake bypass passage means, said intake bypass passage means being opened to the engine intake passage means upstream from the recirculation passage means, first air filter means provided in said engine intake air inlet passage means upstream from the intake air inlet opening means and second air filter means provided in said engine intake passage means downstream from the intake air outlet opening means at a position downstream from the intake bypass passage means and upstream from the recirculation passage means, intercooler means provided in said engine intake passage means downstream from the second filter means and upstream from the recirculation passage means.

* * * * *